United States Patent
Katougi et al.

(10) Patent No.: US 9,459,610 B2
(45) Date of Patent: Oct. 4, 2016

(54) ELECTRIC DISCHARGE MACHINE WITH CONTACT DETECTOR AND POSITION DETECTOR

(75) Inventors: Hidetaka Katougi, Chiyoda-ku (JP); Toshiaki Kurokawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 534 days.

(21) Appl. No.: 14/000,298

(22) PCT Filed: Apr. 11, 2011

(86) PCT No.: PCT/JP2011/059025
§ 371 (c)(1),
(2), (4) Date: Aug. 19, 2013

(87) PCT Pub. No.: WO2012/140723
PCT Pub. Date: Oct. 18, 2012

(65) Prior Publication Data
US 2013/0325163 A1 Dec. 5, 2013

(51) Int. Cl.
*G05B 19/18* (2006.01)
*B23H 7/18* (2006.01)
*B23H 7/26* (2006.01)

(52) U.S. Cl.
CPC .............. *G05B 19/18* (2013.01); *B23H 7/18* (2013.01); *B23H 7/26* (2013.01)

(58) Field of Classification Search
None
See application file for complete search history.

(56) References Cited

U.S. PATENT DOCUMENTS

| | | | | |
|---|---|---|---|---|
| 4,654,497 A | * | 3/1987 | Obara | B23H 1/02 219/69.13 |
| 5,118,914 A | | 6/1992 | Girardin et al. | |
| 5,267,141 A | | 11/1993 | Morita et al. | |
| 7,328,081 B2 | * | 2/2008 | Kluft | G05B 19/4065 700/175 |
| 2009/0204272 A1 | * | 8/2009 | Yuzawa | G05B 19/27 700/302 |

FOREIGN PATENT DOCUMENTS

| | | |
|---|---|---|
| DE | 9421085 U1 | 5/1995 |
| DE | 3943693 C1 | 2/1999 |

(Continued)

OTHER PUBLICATIONS

English translation of Taneda Japanese Patent Publication No. 06-063822.*

(Continued)

*Primary Examiner* — Mohammad Ali
*Assistant Examiner* — Bernard G Lindsay
(74) *Attorney, Agent, or Firm* — Sughrue Mion, PLLC

(57) ABSTRACT

An electric discharge machine includes at least one of a noncontact-position detection sensor that outputs a detection signal when a distance between a first contact body and a second contact body is equal to a preset residual distance in a noncontact phase and a drive unit that detects a load given on the main spindle, and a main-spindle-drive control unit stops moving of the main spindle in at least either a case where a moving amount of the main spindle since the noncontact-position detection sensor outputs the detection signal exceeds the residual distance or a case where it is determined that an overload is given from a detection result of the drive unit.

5 Claims, 12 Drawing Sheets

(56) References Cited

FOREIGN PATENT DOCUMENTS

| | | |
|---|---|---|
| JP | 62-34725 A | 2/1987 |
| JP | 62-271633 A | 11/1987 |
| JP | 63-306834 A | 12/1988 |
| JP | 3-149135 A | 6/1991 |
| JP | 4-129646 A | 4/1992 |
| JP | 5-2837 U | 1/1993 |
| JP | 7-88722 A | 4/1995 |
| JP | 7-129211 A | 5/1995 |
| JP | 7-245986 A | 9/1995 |
| JP | 8-323585 A | 12/1996 |
| JP | 2000-107945 A | 4/2000 |
| JP | 2001-150287 A | 6/2001 |
| WO | 2009128156 A1 | 10/2009 |

OTHER PUBLICATIONS

Communication dated Jul. 24, 2014, from the German Patent and Trademark Office in counterpart German Application No. 112011105025.9.

International Search Report for PCT/JP2011/059025 dated May 10, 2011 English Translation.

* cited by examiner

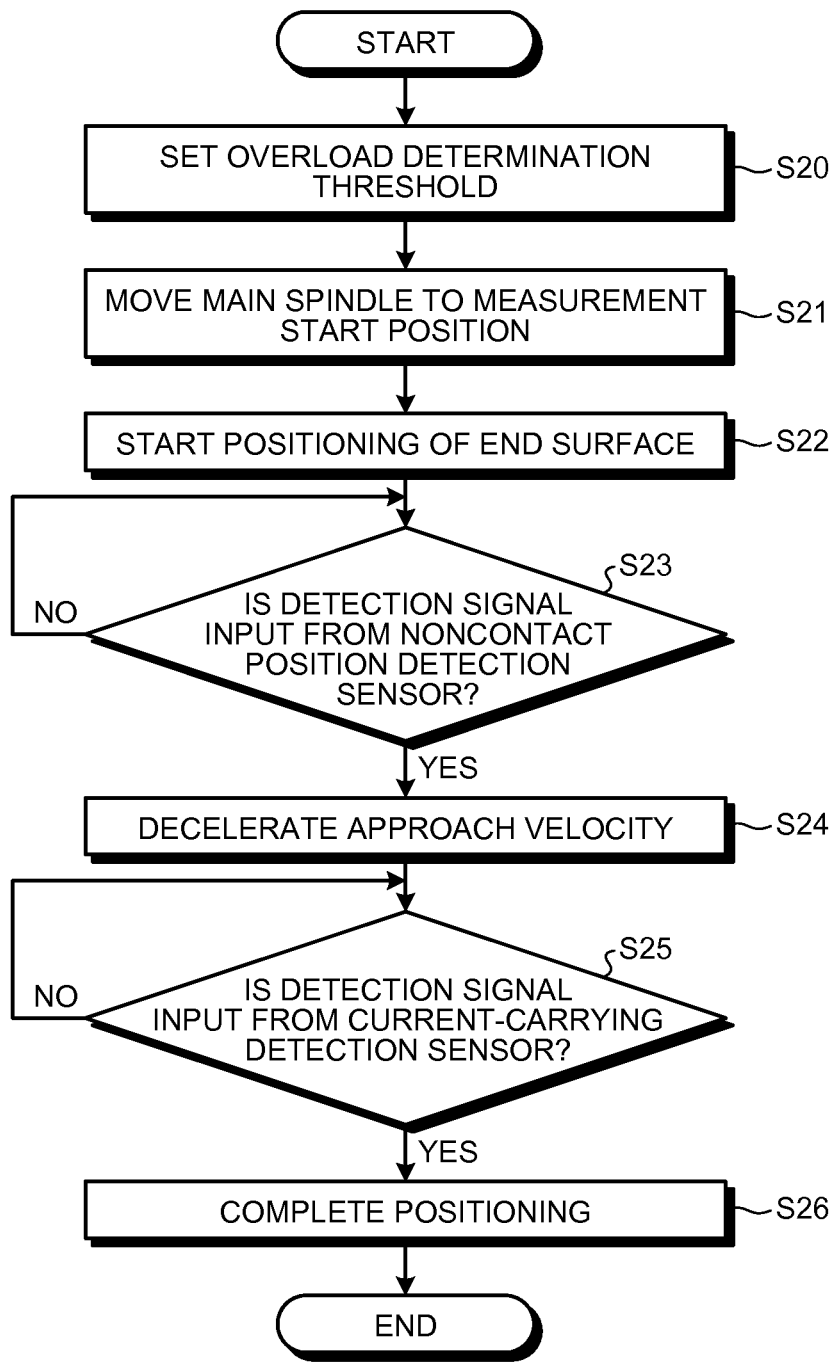

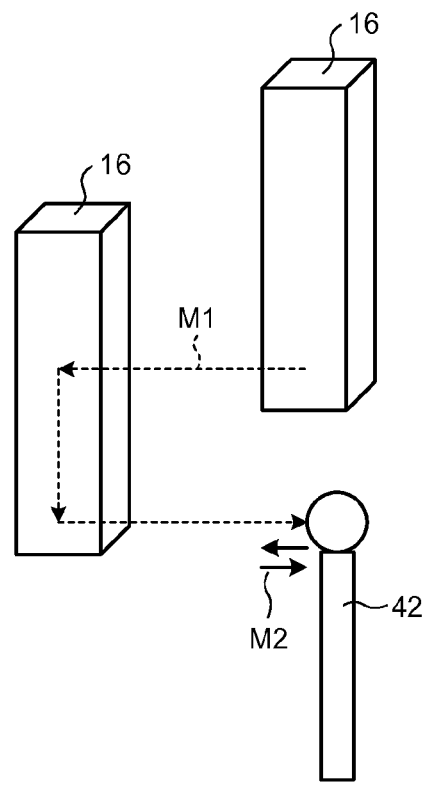
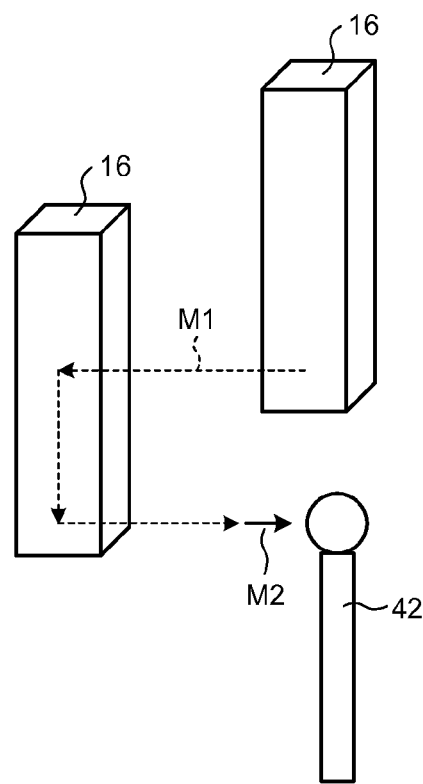

| APPROACH VELOCITY (mm/min) | DROOP (μm) | OVERSHOOT AMOUNT (μm) |
|---|---|---|
| 3.0 | 1.9 | 0.6 |
| 6.0 | 5.5 | 1.0 |
| 30.0 | 18.5 | 3.0 |
| 300.0 | 180.0 | 24.0 |
| 570.0 | 343.0 | 55.0 |

FIG.15

| CLASS | MATERIAL | SIZE | OVERLOAD DETERMINATION THRESHOLD |
|---|---|---|---|
| TOOL ELECTRODE | Cu | TO □10 | 10% |
| TOOL ELECTRODE | Cu | □10 TO □30 | 15% |
| TOOL ELECTRODE | Cu | □30 TO □50 | 20% |
| TOOL ELECTRODE | Cu | □50 TO | 25% |
| TOOL ELECTRODE | CuW | TO □10 | 10% |
| ... | | | |
| GAUGE HEAD | St | TO φ1 | 5% |
| GAUGE HEAD | St | φ1 TO 5 | 5% |
| ... | | | |

ELECTRIC DISCHARGE MACHINE WITH CONTACT DETECTOR AND POSITION DETECTOR

CROSS REFERENCE TO RELATED APPLICATIONS

This application is a National Stage of International Application No. PCT/JP2011/059025filed Apr. 11, 2011, the contents of which are incorporated herein by reference in their entirety.

FIELD

The present invention relates to an electric discharge machine, and more particularly to an electric discharge machine including a function for compensating for a positioning operation in general electric discharge machining.

BACKGROUND

Generally, an electric discharge machine applies a preset voltage between a tool electrode attached to a main spindle and a workpiece attached to a working table and recognizes the positional relation between the tool electrode and the workpiece based on an electric current carried at the time of the contact between the tool electrode and the workpiece. The main spindle moves so as to make the tool electrode closer to the workpiece in a state where the voltage is applied between the tool electrode and the workpiece, and stops when it is recognized that the current flows between the tool electrode and the workpiece. A numerical control device recognizes a position at which it is recognized that the current flows between the tool electrode and the workpiece as a contact position between the tool electrode and the workpiece.

When an electric discharge phenomenon occurs before the tool electrode and the workpiece physically contact each other, then the numerical control device erroneously recognizes current-carrying resulting from the electric discharge phenomenon as the contact between the tool electrode and the workpiece, and it is difficult for the numerical control device to recognize the accurate positional relation between the tool electrode and the workpiece. As the applied voltage between the tool electrode and the workpiece is higher, the electric discharge phenomenon between the tool electrode and the workpiece tends to occur. To recognize the accurate positional relation between the tool electrode and the workpiece, it is considered to be desirable to suppress the electric discharge phenomenon by making the applied voltage between the tool electrode and the workpiece as low as possible, and to generate the current-carrying at a limit of the physical contact between the tool electrode and the workpiece.

For example, it is often difficult for a die-sinking electric discharge machine or the like to make the tool electrode directly contact the workpiece, depending on the shape of the tool electrode or the workpiece. In this case, the electric discharge machine often uses gauge heads called reference spheres while arranging the gauge heads at arbitrary positions of the main spindle and the workpiece, respectively. After carrying a current between the gauge heads in place of the tool electrode and the workpiece, the electric discharge machine performs the positioning of the workpiece based on the current carried between the gauge head attached to the main spindle and the workpiece and the positioning of the tool electrode based on the current carried between the gauge head attached to the workpiece and the tool electrode.

In recent years, the electric discharge machine is required to provide a more accurate positioning performance. The electric discharge machine tends to ensure the more accurate positional relation while suppressing the applied voltage between the tool electrode and the workpiece to a few volts to several tens of volts, for example. However, when foreign matters such as minute machining waste are attached onto the tool electrode, the workpiece or the gauge heads, current-carrying characteristics degrade as the electric resistance of the foreign matters is higher or the applied voltage is lower. When the foreign matters interpose in the contact between the tool electrode and the workpiece or between the gauge heads, flaws or impressions are often generated on the tool electrode, the workpiece or the gauge heads. At the low applied voltage, the current-carrying is possibly not detected until the physical contact starts because of the electric resistance of the material of the workpiece, the presence of thermal treatment or the like. In this case, similarly to the above case, flaws, impressions or the like are generated as a result of an excessive load given on the tool electrode, the workpiece or the gauge heads before the main spindle stops.

When a collision-caused impact occurs at the time of the physical contact between the tool electrode and the workpiece or between the gauge heads, an error is often generated in positional information due to transient response. Accordingly, after the current-carrying is detected, the main spindle often moves in an opposite direction to a moving direction in which the main spindle moves so far and the electric discharge machine performs an operation for detecting the contact based on the current-carrying again or repeatedly by an arbitrary number of times. At this time, when the moving velocity of the main spindle decelerates, the transient response-caused error can be reduced but the time required for the positioning operation increases. When the moving velocity of the main spindle accelerates, then vibration or elastic deformation is often generated depending on the shape or rigidity of the tool electrode, the workpiece or the gauge heads, and the accurate positional information cannot be often obtained. Therefore, appropriately limiting the moving velocity of the main spindle for the detection of the contact based on the current-carrying is considered to be also one of the objects of the electric discharge machine.

In recent years, a technique for detecting the interference of the tool electrode or the like by an overload on the main spindle is realized in the positioning operation performed by a wire electric discharge machine, a machine tool or the like that uses a wire as the tool electrode (see, for example, Patent Literature 1). The wire electric discharge machine, the machine tool or the like stops the subsequent positioning operation when detecting the overload, thereby suppressing damage on tools such as the tool electrode and the gauge heads, an apparatus main body and the workpiece. In the case of the die-sinking electric discharge machine, it is capable of suppressing the damage by allowing a worker to perform the positioning at an interference-free location because the worker is responsible for the positioning in many cases.

CITATION LIST

Patent Literature

Patent Literature 1: Japanese Patent Application Laid-open No. 4-129646

SUMMARY

Technical Problem

When a table surface plate is an insulator or the electric resistance of the workpiece is high, the electric discharge machine often does not function effectively to detect the contact between the tool electrode and the workpiece or between the gauge heads based on the current-carrying. Furthermore, it possibly occurs that the worker does not recognize that the electric discharge machine does not function to detect the contact based on the current-carrying because of the electric resistance and the like or that a mechanism for the detection of the contact fails and does not function. In such a case, when the positioning operation continues, the tools such as the tool electrode and the gauge heads, the apparatus main body or the workpiece is often damaged. With the conventional technique for stopping the main spindle when the overload on the main spindle is detected, it is difficult to sufficiently suppress the failure that possibly occurs due to an abnormality in the positioning operation although it is possible to protect the main spindle itself. The overload on the spindle results in a failure of the apparatus main body. This may also require the work to stop or start over again due to the forced outage according to an automatic operation or an operation in response to an alarm.

The present invention has been achieved to solve the above problems, and an object of the present invention is to provide an electric discharge machine capable of reducing damage on tools such as a tool electrode and gauge heads, an apparatus main body or a workpiece due to a positioning operation and sufficiently suppressing a failure that possibly occurs due to an abnormality.

Solution to Problem

There is provided an electric discharge machine according to an aspect of the present invention including: a contact detection unit that detects contact between a first contact body and a second contact body based on current-carrying between the first contact body and the second contact body, either a tool electrode attached to a main spindle or a gauge head attached in place of the tool electrode being defined as the first contact body, either a workpiece that is a machining target using the tool electrode or a gauge head attached to the workpiece being defined as the second contact body; and a numerical control device that includes a main-spindle-drive control unit controlling driving of the main spindle, and that recognizes a positional relation between the tool electrode and the workpiece based on a detection result of the contact detection unit, wherein the electric discharge machine comprises at least one of a noncontact-position detection unit that outputs a detection signal when a distance between the first contact body and the second contact body is equal to a preset residual distance in a noncontact phase prior to the contact between the first contact body and the second contact body, and a load detection unit that detects a load given on the main spindle, and the main-spindle-drive control unit stops moving of the main spindle in at least either a case where a moving amount of the main spindle since the noncontact-position detection unit outputs the detection signal exceeds the residual distance or a case where it is determined that an overload is given from a detection result of the load detection unit.

Advantageous Effects of Invention

The electric discharge machine according to the present invention is capable of reducing damage on tools such as the tool electrode and the gauge heads, the apparatus main body or the workpiece when the function of detecting the contact based on the current-carrying fails or the detection delays. The electric discharge machine is also capable of suppressing a secondary failure that possibly occurs due to an abnormality such as damage on the tools such as the tool electrode and the gauge heads, the apparatus main body or the workpiece. Furthermore, the electric discharge machine is capable of decreasing chances that the work stops or starts over again because of the forced outage by preventing the overload on the main spindle in advance or making it possible to instantaneously solve the problem of the overload on the main spindle.

BRIEF DESCRIPTION OF DRAWINGS

FIG. 9 is a flowchart of process procedures of a positioning operation performed by the electric discharge machine.

FIG. 10 is an explanatory diagram of moving of a tool electrode according to a comparative example of the second embodiment.

FIG. 11 is an explanatory diagram of moving of the tool electrode according to the second embodiment.

FIG. 15 is an example of data stored in an overload-determination-threshold database.

DESCRIPTION OF EMBODIMENTS

Exemplary embodiments of an electric discharge machine according to the present invention will be explained below in detail with reference to the accompanying drawings. The present invention is not limited to the embodiments.

First Embodiment

Figure 1:
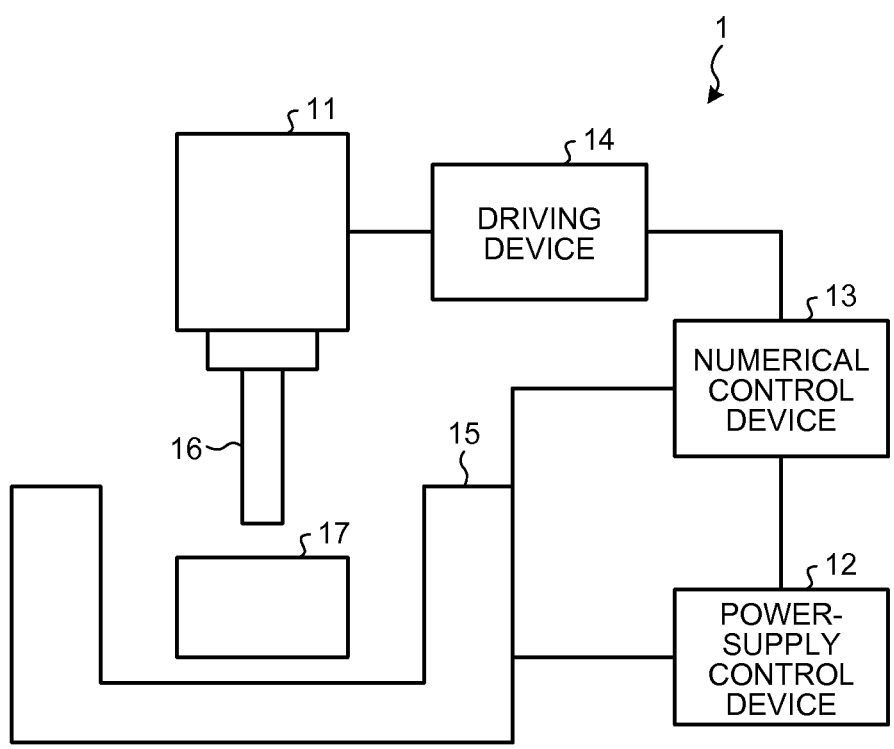
FIG. 1 is a block diagram of a configuration of an electric discharge machine according to the present invention.

FIG. 1 is a block diagram of a configuration of an electric discharge machine according to the present invention. An electric discharge machine 1 includes a main spindle 11, a power-supply control device 12, a numerical control device 13, a driving device 14, a work tank 15, and a tool electrode 16.

The electric discharge machine 1 performs electric discharge machining by supplying a working fluid to a working gap between the tool electrode 16 attached to the main spindle 11 and a workpiece 17 installed in the work tank 15. The driving device 14 drives the main spindle 11 according to a control of the numerical control device 13. The power-supply control device 12 controls a power supply that supplies electric power between the tool electrode 16 and the workpiece 17.

Figure 2:
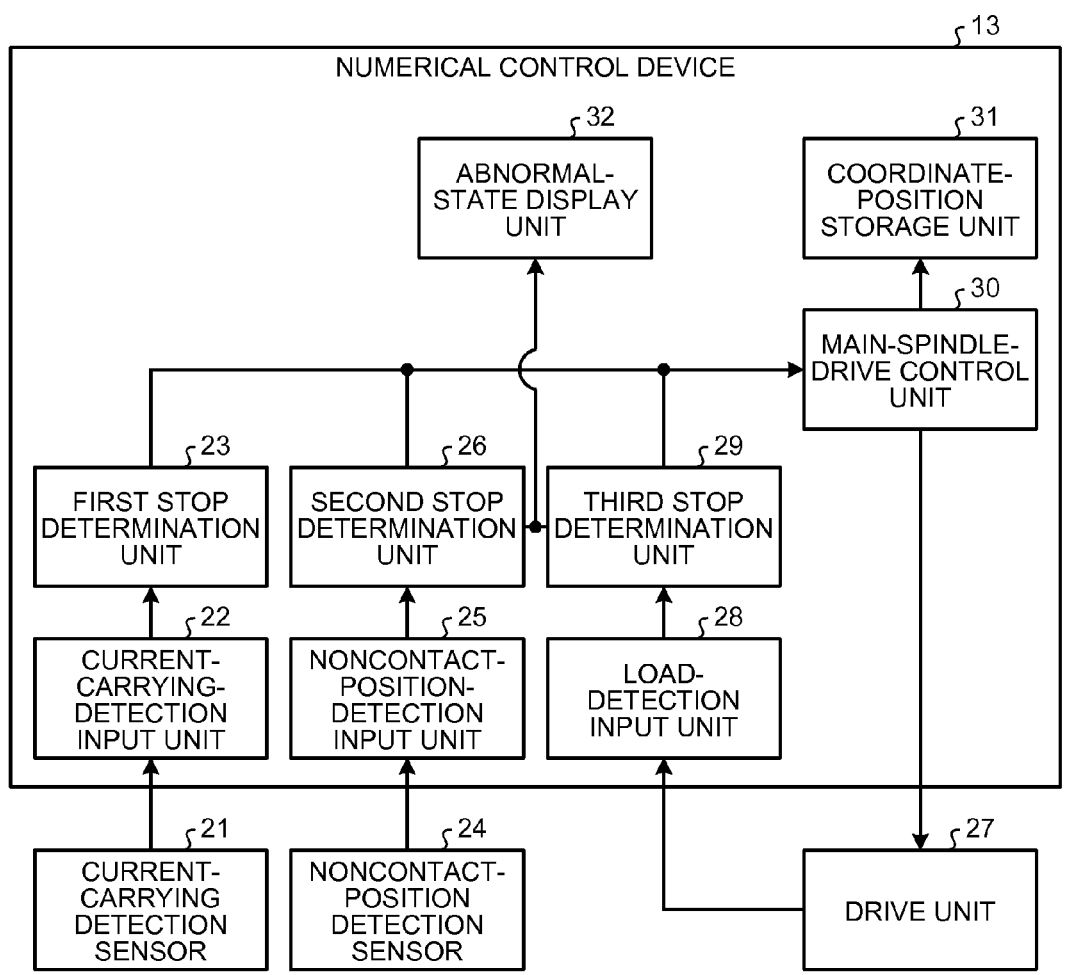
FIG. 2 is a block diagram of a configuration for controlling driving of a main spindle in an electric discharge machine according to a first embodiment.

FIG. 2 is a block diagram of a configuration for controlling driving of the main spindle in an electric discharge machine according to a first embodiment. The electric discharge machine 1 applies a preset voltage between the tool electrode 16 that is a first contact body attached to the main spindle 11 and the workpiece 17 that is a second contact body, and allows the numerical control device 13 to recognize a positional relation between the tool electrode 16 and the workpiece 17 based on current-carrying at the time of contact between the tool electrode 16 and the workpiece 17.

A case of positioning the workpiece 17 that is the second contact body by using the tool electrode 16 as the first contact body attached to the main spindle 11 is described as an example. As the first contact body, a gauge head attached in place of the tool electrode 16 can be used. The electric discharge machine 1 can use a gauge head attached to an arbitrary position of the workpiece 17 as the second contact body. For example, reference spheres are used as the gauge heads.

The numerical control device 13 includes a current-carrying-detection input unit 22, a first stop determination unit 23, a noncontact-position-detection input unit 25, a second stop determination unit 26, a load-detection input unit 28, a third stop determination unit 29, a main-spindle-drive control unit 30, a coordinate-position storage unit 31, and an abnormal-state display unit 32.

A current-carrying detection sensor 21 functions as a contact detection unit that detects the contact between the first contact body and the second contact body based on the current-carrying between the first and second contact bodies. The current-carrying-detection input unit 22 receives an input of a detection result from the current-carrying detection sensor 21. The first stop determination unit 23 determines whether to stop moving of the main spindle 11 according to the detection result input to the current-carrying-detection input unit 22. The numerical control device 13 recognizes a positional relation between the tool electrode 16 and the workpiece 17 based on the detection result input from the current-carrying detection sensor 21.

A noncontact-position detection sensor 24 functions as a noncontact-position-detection unit that outputs a detection signal when a distance between the first contact body and the second contact body is equal to a preset residual distance in a noncontact phase before the contact between the first and second contact bodies. The noncontact-position-detection input unit 25 receives an input of the detection signal from the noncontact-position detection sensor 24. The second stop determination unit 26 determines whether to stop the moving of the main spindle 11 according to the presence of the detection signal input to the noncontact-position-detection input unit 25.

A drive unit 27 drives the main spindle 11 according to the control of the main-spindle-drive control unit 30. Furthermore, the drive unit 27 functions as a load detection unit that detects a load given on the main spindle 11. The load-detection input unit 28 receives an input of a detection result from the drive unit 27. The third stop determination unit 29 determines whether to stop the moving of the main spindle 11 according to the detection result input to the load-detection input unit 28.

The main-spindle-drive control unit 30 controls the drive unit 27. The main-spindle-drive control unit 30 stops the moving of the main spindle 11 when one of the first stop determination unit 23, the second stop determination unit 26, and the third stop determination unit 29 determines to stop the moving of the main spindle 11. The coordinate-position storage unit 31 stores therein coordinates of a position at which the contact between the first contact body and the second contact body is detected.

The abnormal-state display unit 32 informs a worker that an abnormality in a contact detection function based on the current-carrying has occurred when at least one of the second stop determination unit 26 and the third stop determination unit 29 determines to stop the moving of the main spindle 11 by displaying information to the effect.

Figure 3:
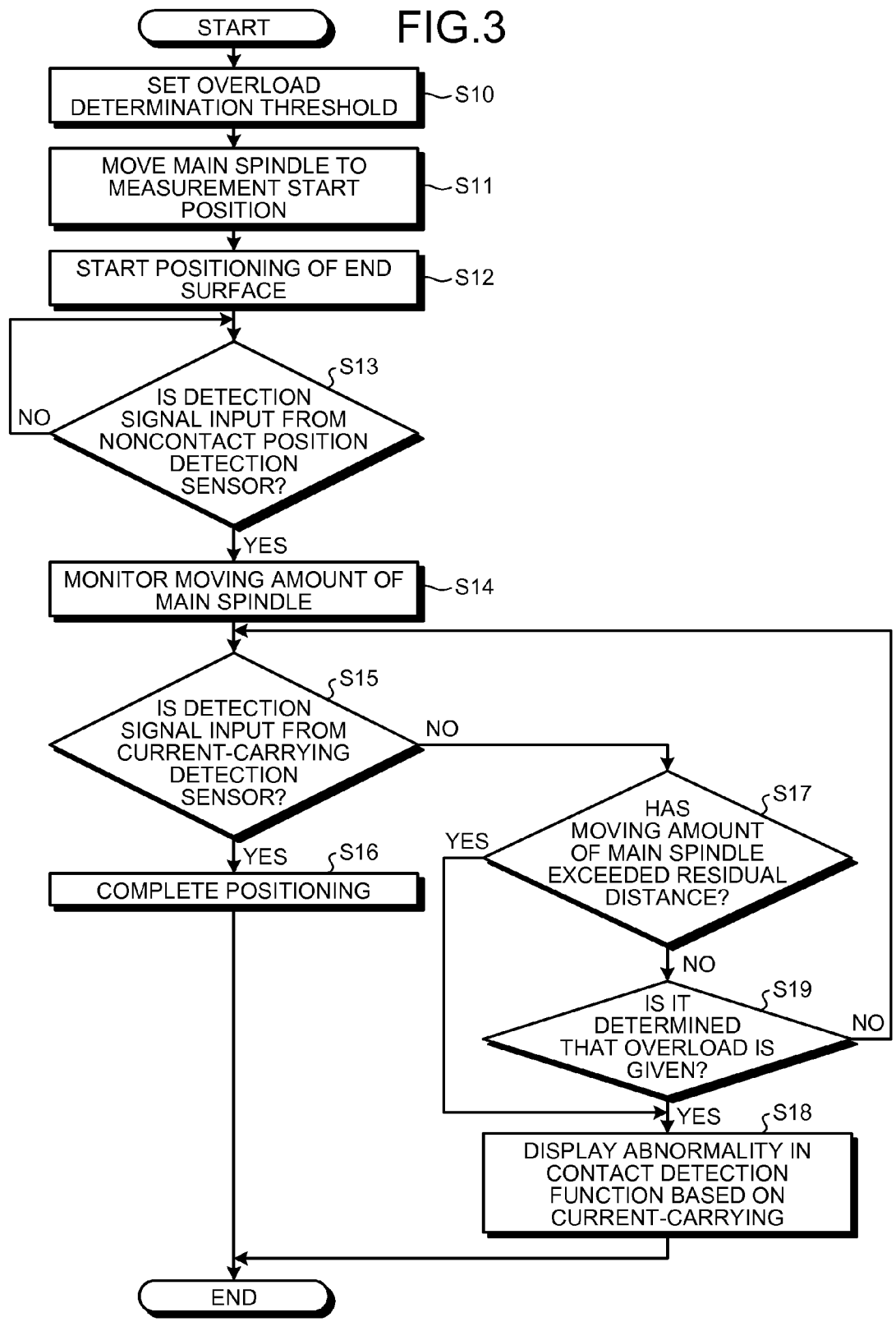
FIG. 3 is a flowchart of process procedures of a positioning operation performed by the electric discharge machine.

Process procedures of an operation performed by the electric discharge machine 1 configured as described above are described with reference to a flowchart of FIG. 3. FIG. 3 is a flowchart of process procedures of a positioning operation performed by the electric discharge machine. The worker sets an overload determination threshold at the time of starting the positioning operation using the tool electrode 16 and the workpiece 17 (Step S10). It is assumed that the overload determination threshold is a reference for an overload determination made by the third stop determination unit 29.

Figure 4:
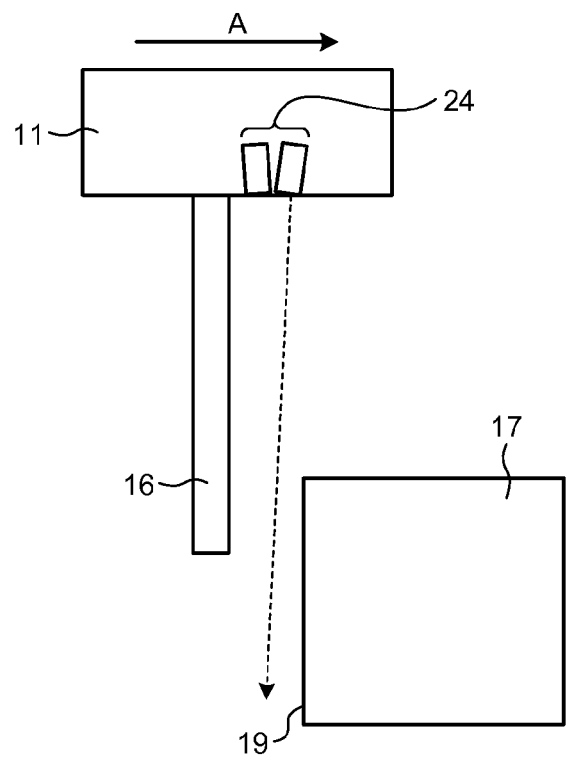
FIG. 4 is a pattern diagram of a state where a tool electrode is moved to a workpiece.

The main-spindle-drive control unit 30 moves the main spindle 11 to a measurement start position (Step S11). Next, the main-spindle-drive control unit 30 moves the tool electrode 16 to be closer to the workpiece 17 at a predetermined approach velocity from the measurement start position and starts positioning an end surface of the workpiece 17 (Step S12). For example, the main-spindle-drive control unit 30 moves the tool electrode 16 in a moving direction A so as to be closer to an end surface 19 of the workpiece 17 as shown in FIG. 4.

Figure 5:
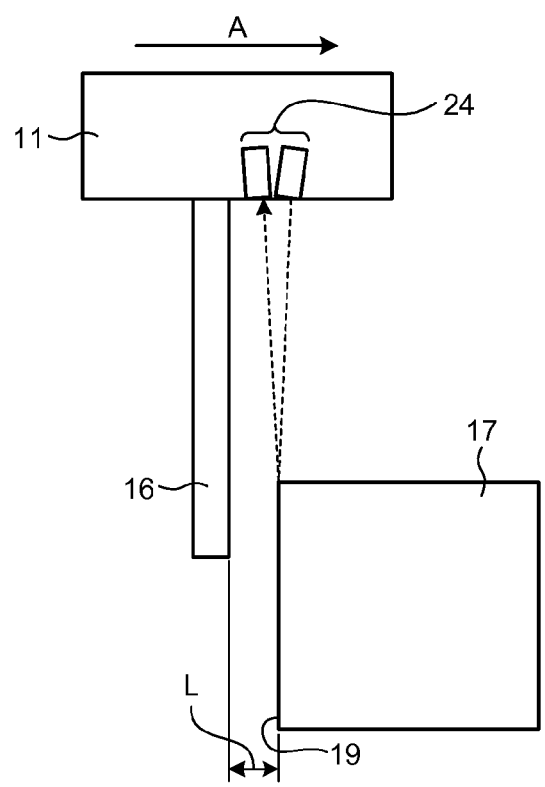
FIG. 5 is a pattern diagram of a state where a distance between the workpiece and the tool electrode is equal to a preset residual distance.

The noncontact-position detection sensor 24 includes, for example, an injection unit that injects light and a light detection unit that detects the light. When the main-spindle-drive control unit 30 moves the tool electrode 16 in the moving direction A and the distance between the end surface 19 and the tool electrode 16 is equal to a preset residual distance L as shown in FIG. 5, the light detection unit of the noncontact-position detection sensor 24 detects the light injected from the injection unit thereof and reflected by the workpiece 17. The noncontact-position detection sensor 24 outputs the detection signal when the light detection unit detects the light injected from the injection unit and reflected by the workpiece 17. The second stop determination unit 26 determines whether the detection signal is input from the noncontact-position detection sensor 24 to the noncontact-position-detection input unit 25 at Step S13 by the time of detecting the contact based on the current-carrying between the tool electrode 16 and the workpiece 17.

When the detection signal is input to the noncontact-position-detection input unit 25 (YES at Step S13), the second stop determination unit 26 monitors a moving amount of the main spindle 11 from the time at which the detection signal is input to the noncontact-position-detection input unit 25 (Step S14). When the detection signal is not input to the noncontact-position-detection input unit 25 (NO at Step S13), the numerical control device 13 waits for the detection signal to be input from the noncontact-position detection sensor 24 to the noncontact-position-detection input unit 25 while continuing to move the main spindle 11.

The first stop determination unit 23 determines, at Step S15, whether a detection signal is input from the current-carrying detection sensor 21 to the current-carrying-detection input unit 22. When the detection signal is input to the current-carrying-detection input unit 22 (YES at Step S15), the first stop determination unit 23 determines to stop the moving of the main spindle 11. The main-spindle-drive control unit 30 stops the moving of the main spindle 11 according to a determination result of the first stop determination unit 23. The coordinate-position storage unit 31 stores therein the coordinates of the position at which the contact between the workpiece 17 and the tool electrode 16 is detected, whereby the numerical control device 13 completes the positioning operation (Step S16). The electric discharge machine 1 thus ends a process for the positioning operation.

When the detection signal is not input to the current-carrying-detection input unit 22 (NO at Step S15), the second stop determination unit 26 determines whether the moving amount of the main spindle 11 from the start of monitoring at Step S14 exceeds the residual distance L (Step S17).

When determining that the moving amount of the main spindle 11 exceeds the residual distance L (YES at Step S17), the second stop determination unit 26 determines to stop the moving of the main spindle 11 because of the occurrence of the abnormality in the contact detection function based on the current-carrying. The main-spindle-drive control unit 30 stops the moving of the main spindle 11 according to a determination result of the second stop determination unit 26. The abnormal-state display unit 32 displays the information to the effect that the abnormality occurs in the contact detection function based on the current-carrying (Step S18). The electric discharge machine 1 thus ends the process for the positioning operation.

Figure 6:
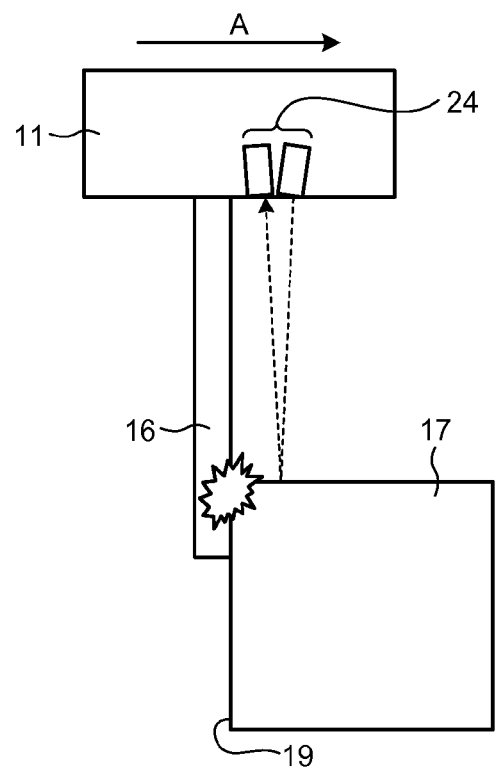
FIG. 6 is a pattern diagram of a state where the tool electrode collides with the workpiece.

When the moving amount of the main spindle 11 matches the residual distance L, the tool electrode 16 reaches the end surface 19. A case where the moving amount of the main spindle 11 exceeds the residual distance L despite prior to the contact base on the current-carrying between the tool electrode 16 and the workpiece 17 indicates a state where the tool electrode 16 already collides with the end surface 19 and is further moving in the moving direction A as shown in FIG. 6. In such a case, the electric discharge machine 1 stops the moving of the main spindle 11, thereby suppressing the moving of the main spindle 11 from continuing despite the contact of the tool electrode 16 with the workpiece 17. The electric discharge machine 1 can thereby suppress damage on the tool electrode 16, the workpiece 17 or an apparatus main body because of the abnormality in the contact detection function based on the current-carrying.

When the second stop determination unit 26 does not determine that the moving amount of the main spindle 11 has exceeded the residual distance (NO at Step S17), the third stop determination unit 29 determines whether an overload is given on the tool electrode 16 and the workpiece 17 from the detection result input from the drive unit 27 to the load-detection input unit 28 (Step S19). The third stop determination unit 29 determines whether the overload is given thereon by comparing a load detected value input to the load-detection input unit 28 with the overload determination threshold set at Step S10.

When the load detected value exceeds the overload determination threshold, the third stop determination unit 29 determines that the overload is given on the tool electrode 16 and the workpiece 17 (YES at Step S19). In this case, the third stop determination unit 29 determines to stop the moving of the main spindle 11 because the abnormality occurs in the contact detection function based on the current-carrying. The main-spindle-drive control unit 30 stops the moving of the main spindle 11 according to a determination result of the third stop determination unit 29. The abnormal-state display unit 32 displays the information to the effect that the abnormality occurs in the contact detection function based on the current-carrying (Step S18). The electric discharge machine 1 thus ends the process for the positioning operation.

When the load detected value has not exceeded the load determination threshold, the third stop determination unit 29 determines that the overload is not given on the tool electrode 16 and the workpiece 17 (NO at Step S19). In this case, the numerical control device 13 repeats the procedures starting at Step S15 while continuing to move the tool electrode 16.

A case where the load detected value exceeds the load determination threshold indicates the state where the tool electrode 16 already collides with the end surface 19 and is further moving in the moving direction A. The electric discharge machine 1 stops the moving of the main spindle 11 when the overload is detected, thereby suppressing the moving of the main spindle 11 from continuing despite the contact of the tool electrode 16 with the workpiece 17. The electric discharge machine 1 can thereby suppress the damage on the tool electrode 16, the workpiece 17 or the apparatus main body because of the abnormality in the contact detection function based on the current-carrying.

Figure 7:
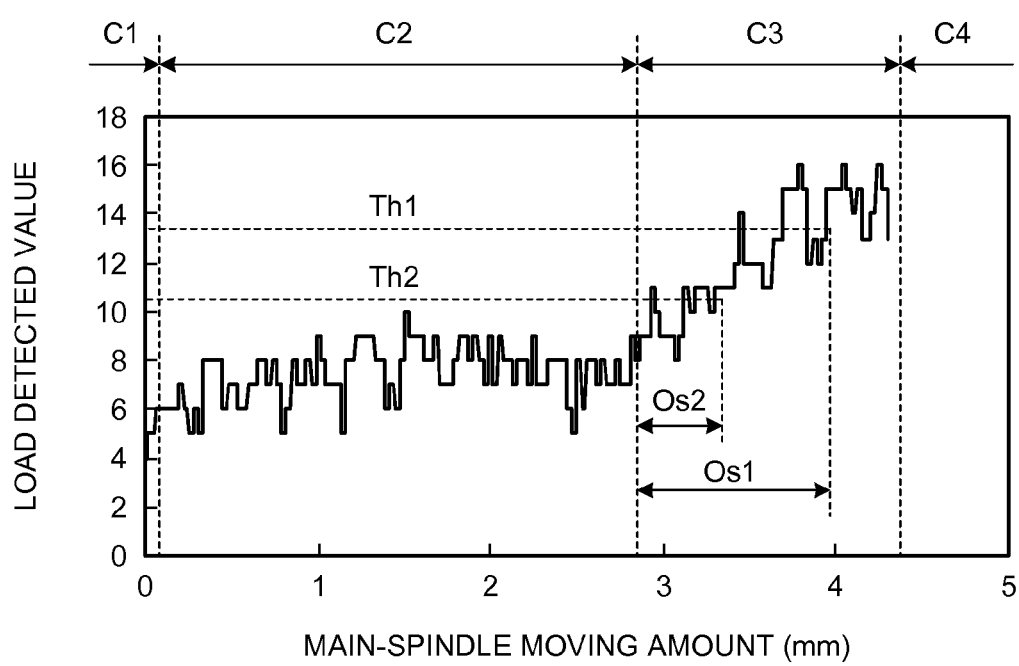
FIG. 7 is an example of a relation between a main-spindle moving amount and a load detected value when the tool electrode collides with the workpiece.

FIG. 7 is an example of a relation between a main-spindle moving amount and the load detected value when the tool electrode collides with the workpiece. The main spindle 11 transitions from a stopped state (the main-spindle moving amount of zero) to an accelerated state C1, a constant velocity state C2, a collision state C3, and to a stopped state C4.

When the tool electrode 16 collides with the workpiece 17 in the constant velocity state C2, the load detected value detected by the drive unit 27 increases according to continuation of the moving of the main spindle 11 from a position at which the collision occurs. It is assumed that an overshoot amount after the collision is Os2 when the overload determination threshold is Th2. When the overload determination threshold is Th1 larger than Th2, the overshoot amount increases to Os1 larger than Os2. However, as the overload determination threshold is set smaller, the third stop determination unit 29 tends to make an erroneous determination resulting from an irregularity in the load detected value.

The relation between the moving amount of the main spindle 11 and the load detected value after the collision depends on shapes of the tool electrode 16 or the gauge head that is the first contact body and of the workpiece 17 or the gauge head that is the second contact body, electric resistances of materials thereof, the presence of thermal treatment or the like. Therefore, it is preferable that the overload determination threshold can be appropriately set according to the shapes and materials of the tool electrode 16, the workpiece 17, and the gauge heads, the presence of thermal treatment or the like.

A stop control over the main spindle 11 in response to the overload is appropriate particularly for a case where rigidity of the tool electrode 16, the workpiece 17, and the gauge heads is sufficiently high and a change in the load detected value occurs after the collision. By setting an appropriate threshold for the overload determination, it is possible to suppress flows and impressions from being generated on the tool electrode 16, the workpiece 17, and the gauge heads when the abnormality occurs in current-carrying detection due to the interposition of foreign matters in the contact between the tool electrode 16 and the workpiece 17 or between the gauge heads.

Furthermore, a stop control over the main spindle 11 in response to excess of the moving amount of the main spindle 11 over the residual distance is appropriate particularly for a case where the rigidity of the tool electrode 16, the workpiece 17, and the gauge heads is comparatively low and the change in the load detected value hardly occurs after the collision. It is thereby possible to suppress the flows and the impressions from being generated on the tool electrode 16, the workpiece 17, and the gauge heads for which a state of the collision is difficult to reflect in the load detected value when the abnormality occurs in the current-carrying.

It suffices that the electric discharge machine 1 executes at least one of the stop control over the main spindle 11 in response to the overload and the stop control over the main spindle 11 in response to the excess of the moving amount of the main spindle 11 over the residual distance. The electric discharge machine 1 can thereby produce an effect of suppressing the flaws and the impressions when the abnormality occurs in the contact detection function based on the current-carrying. In the electric discharge machine 1, it is possible to apply procedures of performing the positioning of the workpiece 17 by moving the first contact body to those of performing the positioning of the tool electrode 16 by moving the second contact body.

Second Embodiment

Figure 8:
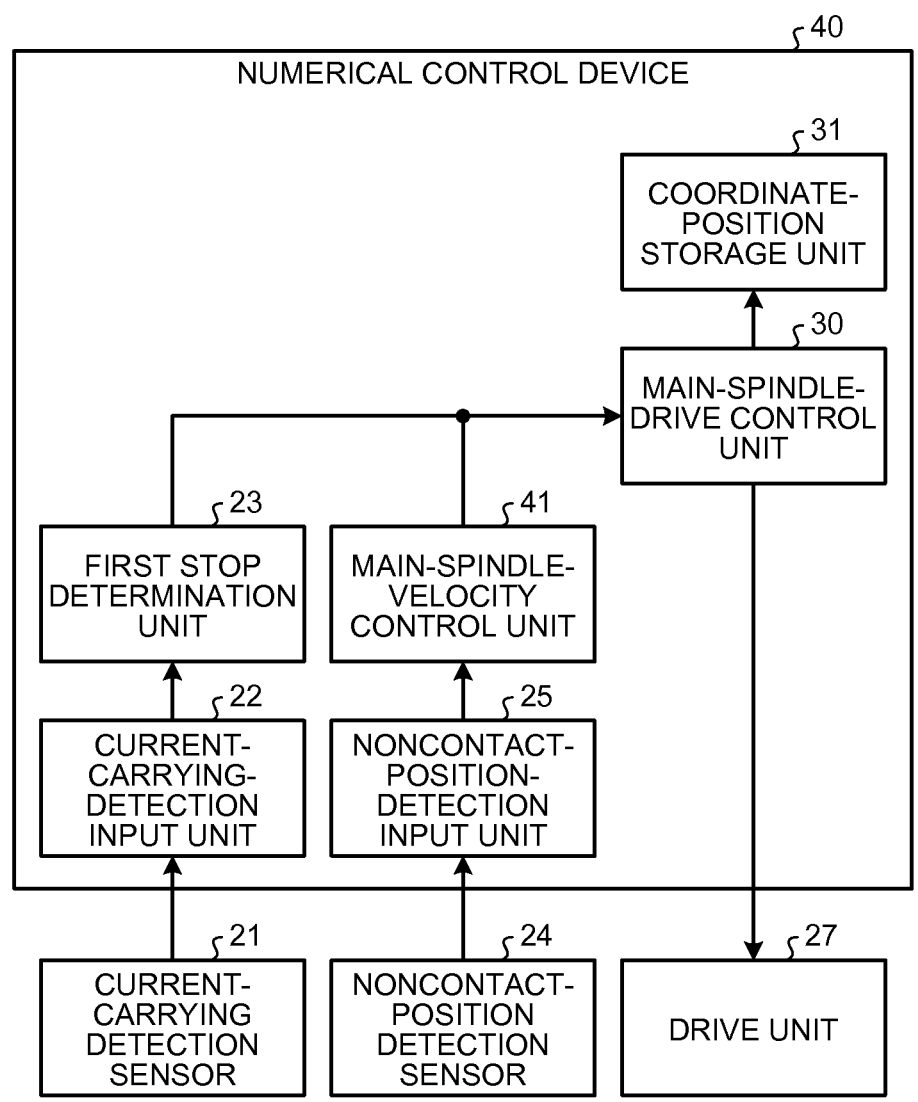
FIG. 8 is a block diagram of a configuration for controlling driving of a main spindle in an electric discharge machine according to a second embodiment.

FIG. 8 is a block diagram of a configuration for controlling driving of the main spindle in an electric discharge machine according to a second embodiment. A numerical control device 40 includes the current-carrying-detection input unit 22, the first stop determination unit 23, the noncontact-position-detection input unit 25, a main-spindle-velocity control unit 41, the main-spindle-drive control unit 30, and the coordinate-position storage unit 31.

The main-spindle-velocity control unit 41 decides an approach velocity according to the detection result input to the noncontact-position-detection input unit 25. The main-spindle-drive control unit 30 stops the moving of the main spindle 11 when the first stop determination unit 23 determines to stop the moving of the main spindle 11. The main-spindle-drive control unit 30 also executes a control of moving the main spindle 11 at the approach velocity decided by the main-spindle-velocity control unit 41.

It is assumed that the electric discharge machine 1 according to the present embodiment executes, similarly to the first embodiment, at least one of the stop control over the main spindle 11 in response to the overload and the stop control over the main spindle 11 in response to the excess of the moving amount of the main spindle 11 over the residual distance. Descriptions of configurations identical to those of the first embodiment in respect of the stop control over the main spindle 11 in response to the overload and the stop control over the main spindle 11 in response to the excess of the moving amount of the main spindle 11 over the residual distance are appropriately omitted.

The case of positioning the workpiece 17 that is the second contact body by using the tool electrode 16 as the first contact body attached to the main spindle 11 is described as an example. As the first contact body, the gauge head attached in place of the tool electrode 16 can be used. The electric discharge machine 1 can use the gauge head attached to an arbitrary position of the workpiece 17 as the second contact body.

Process procedures of an operation performed by the electric discharge machine 1 configured as described above are explained with reference to a flowchart of FIG. 9. FIG. 9 is a flowchart of process procedures of the positioning operation performed by the electric discharge machine. The worker sets the overload determination threshold at the time of starting the positioning operation using the tool electrode 16 and the workpiece 17 (Step S20).

The main-spindle-drive control unit 30 moves the main spindle 11 to the measurement start position (Step S21). Next, the main-spindle-drive control unit 30 moves the tool electrode 16 to be closer to the workpiece 17 at a constant approach velocity from the measurement start position and starts positioning the end surface of the workpiece 17 (Step S22).

When the main-spindle-drive control unit 30 moves the main spindle 11 at the constant approach velocity and the distance between the workpiece 17 and the tool electrode 16 is equal to the preset residual distance L, the noncontact-position detection sensor 24 detects the light reflected by the workpiece 17. The main-spindle-velocity control unit 41 determines whether the detection signal is input from the noncontact-position detection sensor 24 to the noncontact-position-detection input unit 25 at Step S23.

When the detection signal is input to the noncontact-position-detection input unit 25 (YES at Step S23), the main-spindle-velocity control unit 41 decelerates the approach velocity set so far (Step S24). When the detection signal is not input to the noncontact-position-detection input unit 25 (NO at Step S23), the numerical control device 40 waits for the detection signal to be input from the noncontact-position detection sensor 24 to the noncontact-position-detection input unit 25 while continuing to move the main spindle 11 at the approach velocity set so far.

FIG. 10 is an explanatory diagram of the moving of the tool electrode according to a comparative example of the present embodiment. FIG. 11 is an explanatory diagram of the moving of the tool electrode according to the present embodiment. FIGS. 10 and 11 take a case of contacting the tool electrode 16 that is the first contact body with a gauge head 42 that is the second contact body as an example.

In a case of the comparative example shown in FIG. 10, the approach velocity is accelerated during a moving M1 from the measurement start position until the contact of the tool electrode 16 with the gauge head 42 so as to shorten the measurement time. When the tool electrode 16 is moved at a high velocity and the moving of the tool electrode 16 is stopped by the contact of the tool electrode 16 with the gauge head 42, an error may be generated in positional information due to transient response. The error in the positional information due to the transient response possibly changes, depending on shapes and rigidities of the tool electrode 16 and the gauge head 42. Accordingly, the tool electrode 16 moves in an opposite direction to a moving direction in which the tool electrode 16 moves so far and makes a low-velocity moving M2 for the contact based on the current-carrying again or repeatedly by an arbitrary number of times after the current-carrying is detected.

Figures 12, 13:
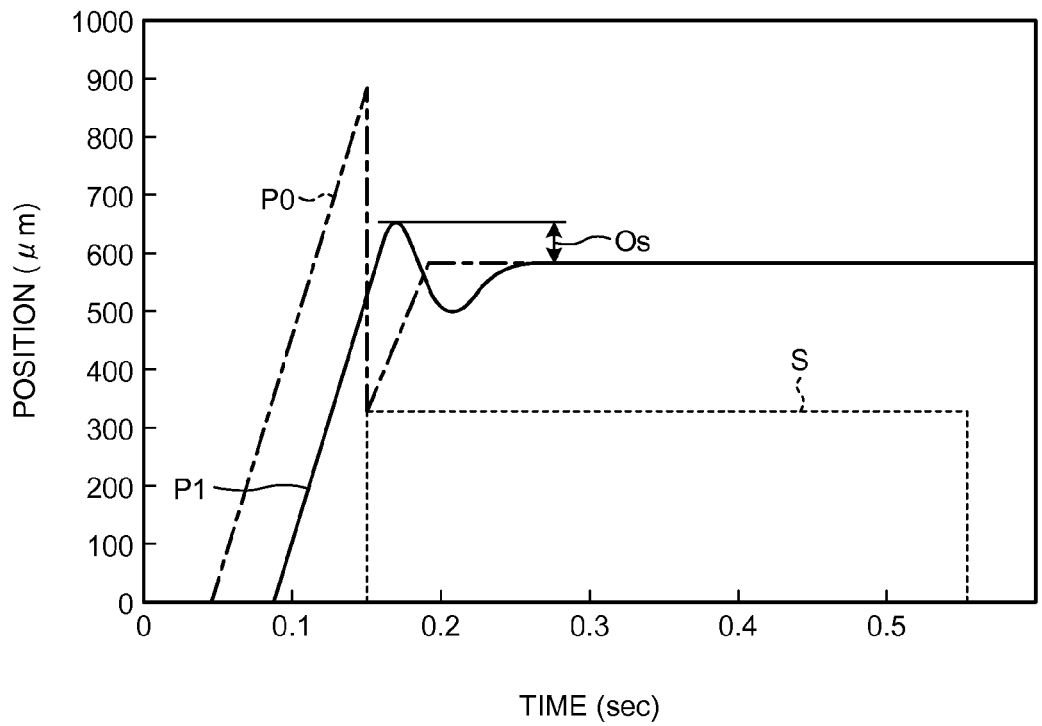
FIG. 12 is an example of a relation between an approach velocity and an error in position information due to transient response.
FIG. 13 is an explanatory diagram of the transient response.

FIG. 12 is an example of a relation between the approach velocity and the error in the position information due to the transient response. FIG. 12 depicts droops (μm) and overshoot amounts (μm) at approach velocities of 3.0, 6.0, 30.0, 300.0, and 570.0 (mm/min), respectively. For example, at the approach velocity of 570.0 mm/min, the overshoot amount of a maximum of 55.0 micrometers due to the transient response is generated. In light of the error due to the transient response, the approach velocity of about 30.0 mm/min is frequently adopted. In this case, the error due to the transient response can be reduced but the measurement time increases.

FIG. 13 is an explanatory diagram of the transient response at the approach velocity of 570.0 mm/min. A vertical axis of a graph shown in FIG. 13 indicates a position (μm) and a horizontal axis thereof indicates a time (sec). After moving the tool electrode 16 in the opposite direction at a timing at which a current-carrying signal S rises once, an overshoot Os of a maximum of about 55 micrometers is generated in the tool electrode 16 due to the transient response and the tool electrode 16 is then adjusted to a position at which the current-carrying signal S rises in response to a position command PO for returning the tool electrode 16 to be closer to the position at which the current-carrying signal S rises.

In a case of the present embodiment shown in FIG. 11, the main-spindle-velocity control unit 41 controls the moving velocity of the main spindle 11 after the noncontact-position detection sensor 24 outputs the detection signal to be lower than the moving velocity of the main spindle 11 before the noncontact-position detection sensor 24 outputs the detection signal. The main-spindle-velocity control unit 41 accelerates the approach velocity to about 570.0 mm/min, for example, during the moving M1 from the measurement start position until the detection signal is input to the noncontact-position-detection input unit 25. Furthermore, the main-spindle-velocity control unit 41 decelerates the approach velocity to such an extent that the error in the positional information due to the transient response can be suppressed, for example, to about 30.0 mm/min during the moving M2 since the detection signal is input to the noncontact-position-detection input unit 25 until the tool electrode 16 contacts the gauge head 42.

The residual distance L (see FIG. 5) at which the noncontact-position detection sensor 24 outputs the detection signal is set so as to be large with respect to the error that is possibly generated due to the transient response. For example, when the approach velocity is 570.0 mm/min during the moving M1, the residual distance L is set to be, for example, equal to or larger than 100 micrometers.

The first stop determination unit 23 determines whether the detection signal is input from the current-carrying detection sensor 21 to the current-carrying-detection input unit 22 at Step S25. When the detection signal is input to the current-carrying-detection input unit 22 (YES at Step S25), the first stop determination unit 23 determines to stop the moving of the main spindle 11. The main-spindle-drive control unit 30 stops the moving of the main spindle 11 according to the determination result of the first stop determination unit 23. The coordinate-position storage unit 31 stores therein the coordinates of the position at which the contact between the workpiece 17 and the tool electrode 16 is detected, whereby the numerical control device 13 completes the positioning operation (Step S26).

When the detection signal is not input to the current-carrying-detection input unit 22 (NO at Step S25), the numerical control device 40 completes the positioning operation at the time at which the input of the detection signal to the current-carrying-detection input unit 22 is recognized (Step S26). The electric discharge machine 1 thus ends the process for the positioning operation.

According to the second embodiment, the electric discharge machine 1 decelerates the approach velocity after the noncontact-position detection sensor 24 outputs the detection signal even when accelerating the approach velocity during the positioning operation. Therefore, it is possible to reduce the positional error due to the transient response. The electric discharge machine 1 can shorten the measurement time because the approach velocity can be accelerated before the noncontact-position detection sensor 24 outputs the detection signal. It is very difficult for the worker himself to define optimum approach velocities at which the positional error due to the transient response and an increase in the time required for the positioning operation can be reduced. The electric discharge machine 1 is capable of easily and promptly defining the optimized approach velocities by adopting the numerical control device 40 that includes the main-spindle-velocity control unit 41.

The electric discharge machine 1 can dispense with the operation for moving the tool electrode 16 in the opposite direction to the moving direction in which the tool electrode 16 moves so far and causing the tool electrode 16 to make the low-velocity moving again or repeatedly by an arbitrary number of times after the current-carrying detection sensor 21 confirms the current-carrying. Furthermore, the electric discharge machine 1 is capable of solving the problem that the accurate positional information cannot be obtained because of the occurrence of the vibration or the elastic deformation depending on the shapes and rigidities of the tool electrode 16, the workpiece 17, and the gauge heads. In the electric discharge machine 1, it is possible to apply the procedures of performing the positioning of the workpiece 17 by moving the first contact body to those of performing the positioning of the tool electrode 16 by moving the second contact body.

Third Embodiment

Figure 14:
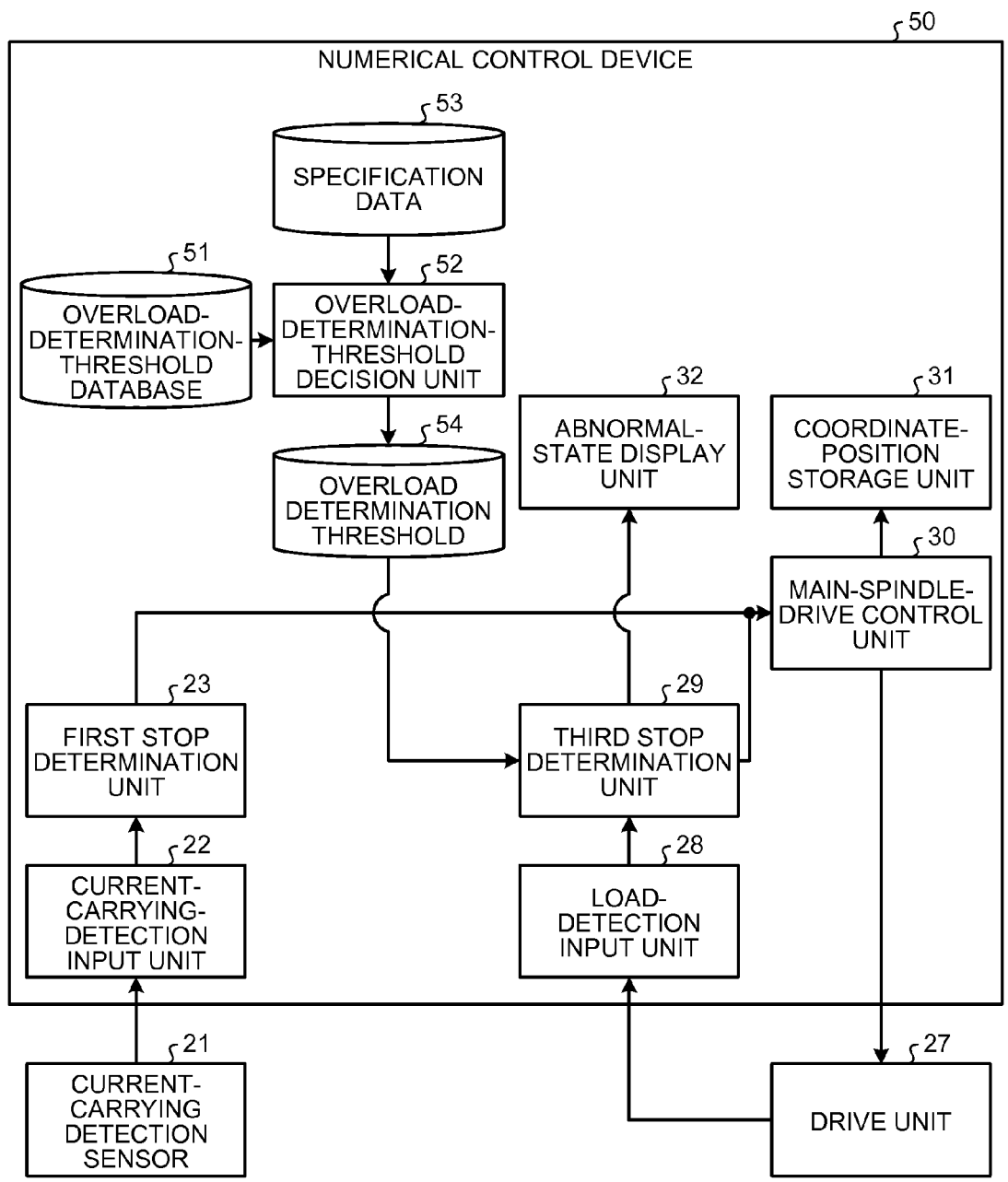
FIG. 14 is a block diagram of a configuration for controlling driving of a main spindle in an electric discharge machine according to a third embodiment.

FIG. 14 is a block diagram of a configuration for controlling driving of the main spindle in an electric discharge machine according to a third embodiment. A numerical control device 50 includes the current-carrying-detection input unit 22, the first stop determination unit 23, the load-detection input unit 28, the third stop determination unit 29, the main-spindle-drive control unit 30, the coordinate-position storage unit 31, the abnormal-state display unit 32, an overload-determination-threshold database 51, and an overload-determination-threshold decision unit 52.

The overload-determination-threshold database 51 stores therein overload determination thresholds for determining whether the overload is given. The overload-determination-threshold decision unit 52 decides an overload determination threshold 54 to be read from the overload-determination-threshold database 51 while referring to specification data 53. The specification data 53 is assumed as data on sizes, materials, and the like of the tool electrode 16, the workpiece 17, and the gauge heads.

FIG. 15 is an example of the data stored in the overload-determination-threshold database 51. In this example, the overload-determination-threshold database 51 stores therein the overload determination thresholds while making the overload determination thresholds correspond to classes (part names), the materials, and the sizes. It is assumed that each of the overload determination thresholds represents, for example, a difference between an upper limit of the load detected value that is determined not to be the overload and a preset standard value as a percentage.

Figure 16:
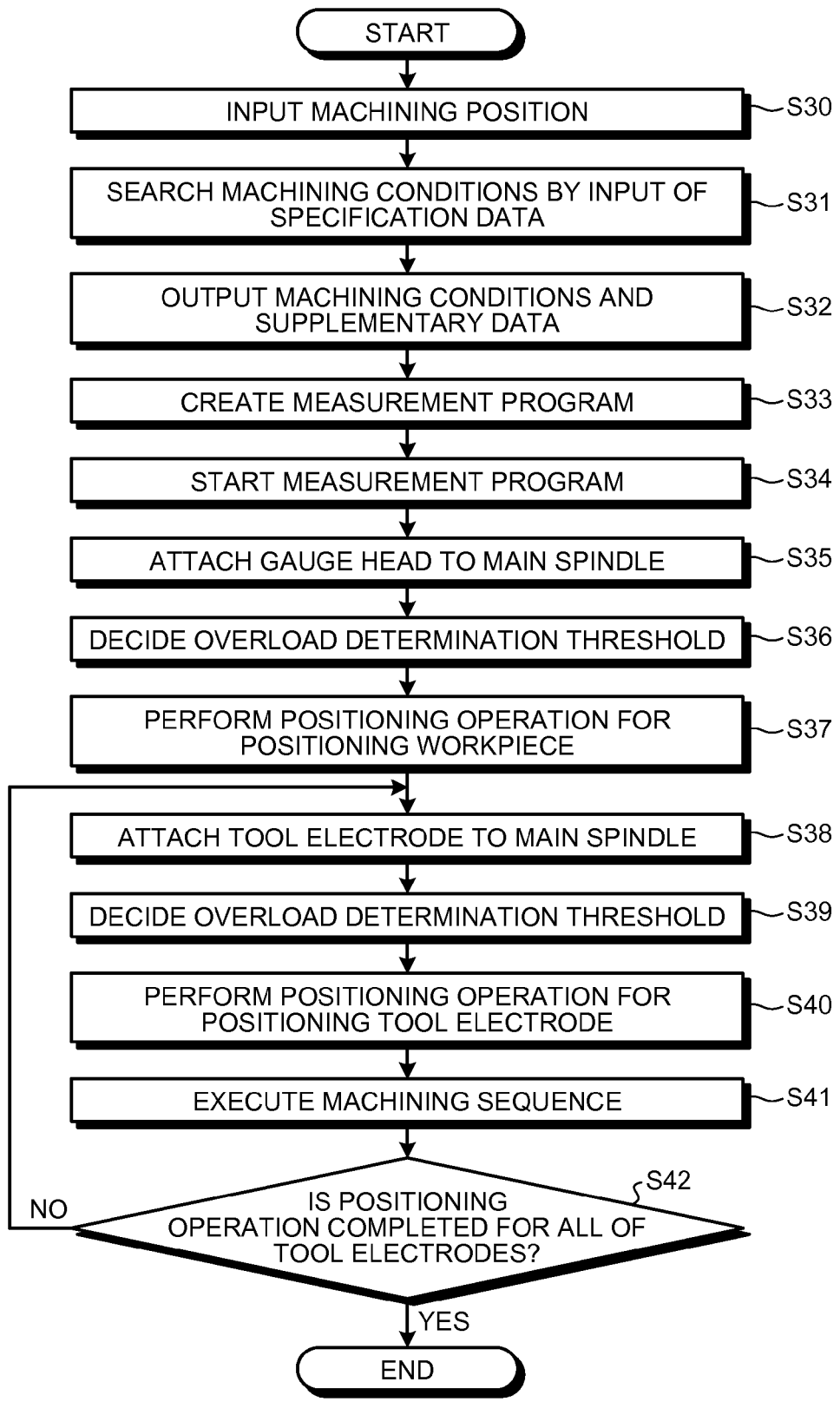
FIG. 16 is a flowchart of process procedures of the electric discharge machine.

Process procedures of an operation performed by the electric discharge machine 1 configured as described above are explained with reference to a flowchart of FIG. 16. FIG.

16 is a flowchart of process procedures of the electric discharge machine. The worker inputs a machining position where the workpiece 17 is machined by the tool electrode 16 while referring to a chart or the like at a start of a machining work by an automated operation of the electric discharge machine 1 (Step S30).

The worker searches machining conditions by inputting the specification data so as to set the machining conditions to be used (Step S31). The machining conditions include data such as a pulse width and a voltage level of a machining voltage to be set to the power-supply control device 12 (see FIG. 1) as well as data on upward and downward motions of the main spindle 11 for discharging the machining waste, data on an operation performed by the main spindle 11 for making the voltage applied between the first and second contact bodies constant, and the like.

The specification data for searching the machining conditions is assumed as the materials, the sizes of the tool electrode 16 and the workpiece 17, a target worked surface roughness, and the like. The electric discharge machine 1 outputs data such as the materials and the sizes necessary to decide the overload determination threshold among the specification data input for the search of the machining conditions as supplementary data together with the machining conditions (Step S32).

Next, the worker inputs the specification data 53 necessary for automatically performing the positioning of the tool electrode 16 and the workpiece 17 to the electric discharge machine 1 and creates a measurement program (Step S33). After creating the measurement program, the worker starts the measurement program (Step S34). When starting the measurement program, the worker attaches the gauge head to the main spindle 11 for the positioning of the workpiece 17 (Step S35).

The overload-determination-threshold decision unit 52 decides the overload determination threshold for the positioning of the workpiece 17 by checking the overload-determination-threshold database 51 with respect to the specification data 53 (Step S36). The electric discharge machine 1 performs the positioning operation for positioning the workpiece 17 in a state of making a contact detection function based on the overload effective similarly to the first embodiment (Step S37).

Next, the worker attaches the tool electrode 16 to the main spindle 11 for the positioning of the tool electrode 16 (Step S38). The overload-determination-threshold decision unit 52 decides the overload determination threshold for the positioning of the tool electrode 16 by checking the overload-determination-threshold database 51 with respect to the specification data 53 (Step S39). The electric discharge machine 1 performs the positioning operation for positioning the tool electrode 16 in the state of making the contact detection function based on the overload effective similarly to the first embodiment (Step S40).

When completing the positioning operation as described above, the electric discharge machine 1 executes a machining sequence (Step S41). Next, when the positioning operation and the machining sequence are not completed for all of tool electrodes 16 used for machining the workpiece 17 (NO at Step S42), the worker repeats the procedures starting at Step S38 for the other tool electrodes 16. When the positioning operation and the machining sequence are completed for all the tool electrodes 16 used for machining the workpiece 17 (YES at Step S42), the electric discharge machine 1 ends the machining work based on the automated operation.

According to the third embodiment, the electric discharge machine 1 calculates the optimum overload determination threshold using the specification data input during the search of the machining conditions and the creation of the measurement program, and incorporates the overload determination threshold as data on a machining condition sequence. The worker can adopt the optimum overload determination threshold according to the tool electrode 16 and the like and monitor the overload. Accordingly, for example, if the moving amount is erroneously set for the upward and downward motions of the main spindle 11 for the discharge of the machining waste and the tool electrode 16 is collided with the workpiece 17 or the tool electrode 16 is collided with a non-current-carrying portion during the automated operation because of a program error, the overshoot amount during the collision can be reduced.

The electric discharge machine 1 according to the present embodiment can execute the stop control over the main spindle 11 in response to the excess of the moving amount of the main spindle 11 over the residual distance similarly to the first embodiment.

REFERENCE SIGNS LIST 1 electric discharge machine
11 main spindle
12 power-supply control device
13 numerical control device
14 driving device
15 work tank
16 tool electrode
17 workpiece
19 end surface
21 current-carrying detection sensor
22 current-carrying-detection input unit
23 first stop determination unit
24 noncontact-position detection sensor
25 noncontact-position-detection input unit
26 second stop determination unit
27 drive unit
28 load-detection input unit
29 third stop determination unit
30 main-spindle-drive control unit
31 coordinate-position storage unit
32 abnormal-state display unit
40 numerical control device
41 main-spindle-velocity control unit
42 gauge head
50 numerical control device
51 overload-determination-threshold database
52 overload-determination-threshold decision unit
53 specification data
54 overload determination threshold

The invention claimed is:
1. An electric discharge machine comprising:
a contact detector to detect contact between a first contact body and a second contact body based on current flowing between the first contact body and the second contact body, the first contact body corresponding to a tool electrode attached to a main spindle or a gauge head attached in place of the tool electrode, the second contact body corresponding to a workpiece or a gauge head attached to the workpiece;
a numerical control device that includes a main-spindle-drive controller to control driving of the main spindle, and that recognizes a positional relation between the tool electrode and the workpiece based on a detection result of the contact detector;

a noncontact-position detector to output a detection signal when a distance between the first contact body and the second contact body is equal to a preset residual distance prior to the contact between the first contact body and the second contact body, and at least one stop determiner to start monitoring a moving amount of the main spindle when the distance between the first contact body and the second contact body becomes equal to the preset residual distance, wherein the main-spindle-drive controller stops the main spindle from moving in response to the contact not being detected based on the current flowing between the first contact body and the second contact body, in combination with the monitored moving amount exceeding the preset residual distance.

2. The electric discharge machine according to claim 1, wherein the main-spindle-drive controller stops the moving of the main spindle in a case where a load detector determines that an overload is given from the detection result of the load detector and the contact detector does not detect the contact between the first contact body and the second contact body.

3. The electric discharge machine according to claim 1, further comprising a main-spindle-velocity controller that controls a velocity for moving the main spindle, wherein
the main-spindle-velocity controller controls a moving velocity of the main spindle after the noncontact-position detector outputs the detection signal to be lower than a moving velocity of the main spindle before the noncontact-position detector outputs the detection signal.

4. The electric discharge machine according to claim 1, further comprising an overload-determination-threshold decider to decide an overload determination threshold, which is for determining whether the overload is given from the detection result of the overload detector, according to specification data on at least one of the tool electrode, the workpiece, and the gauge heads.

5. The electric discharge machine according to claim 1, further comprising a load detector to detect a load placed on the main spindle,
wherein the main-spindle-drive controller stops the main spindle from moving in response to the load detector determining the first contact body is overloaded.

* * * * *